Patented Mar. 13, 1951

2,544,869

UNITED STATES PATENT OFFICE 2,544,869

PREPARATION OF A SILICA-MAGNESIA CATALYST

Glenn M. Webb, Western Springs, Reno W. Moehl, Congress Park, and Maurice J. Murray, Clarendon Hills, Ill., assignors to Universal Oil Products Company, Chicago, Ill., a corporation of Delaware No Drawing. Application July 25, 1947, Serial No. 763,556

9 Claims. (Cl. 252—448)

This invention relates to improvements in the manufacture of catalytic composites of silica and magnesium oxide, and to the use of these improved catalysts in effecting hydrocarbon conversion reactions.

Catalytic composites of silica and magnesium oxide are particularly suitable for effecting various hydrocarbon conversion reactions. These catalysts are especially desirable for use in the cracking of higher boiling oils to produce gasoline, as these catalysts appear to yield a better product distribution than is obtainable with other conventional cracking catalysts. The product distribution with these catalysts include higher gasoline yields and lower coke and normally gaseous products. In addition, the normally gaseous products formed in the presence of the silica-magnesium oxide catalysts are higher in olefinic constituents and, therefore, permits further increased yields of gasoline by the well known process of polymerization of the gaseous olefins to gasoline. The cracking reaction is generally effected at temperatures within the range of from about 800° to about 1100° F. and at moderately superatmospheric pressures which generally are below about 50 pounds per square inch.

Silica-magnesia catalysts may also find particular utility in other hydrocarbon conversion reactions including (1) treatment of gasoline to improve its anti-knock properties, in the well known processes commonly referred to in the art as reforming, isoforming, retreating, etc., (2) alkyl transfer reactions as, for example, the reaction of xylene with benzene to form toluene, etc., (3) refining of hydrocarbons and particularly gasoline to remove undesirable impurities such as sulfur, etc., (4) alkylation of aromatic or isoparaffinic hydrocarbons with olefinic hydrocarbons, alcohols, esters, etc., (5) polymerization of unsaturated hydrocarbons to form higher boiling products, etc. In addition, these catalysts may find particular utility in the treatment of other organic materials as, for example, the dehydration of alcohols to form hydrocarbons, etc. The temperature and pressure to be employed in the process will depend upon the particular reaction to be effected.

It has been found that the active catalyst for use in cracking reactions requires concentrations of magnesium oxide of at least 20% and generally within the range of from about 20 to about 40% by weight of the final composite. While satisfactory catalysts containing magnesium oxide in this range may be prepared through the use of a salt of magnesium, such as magnesium chloride, magnesium sulfate, etc., this method of preparation is time consuming and expensive because of the high cost of the magnesium salt and because of the large amount of precipitant, such as ammonium hydroxide, required to precipitate magnesium oxide.

Another major disadvantage to this method of preparation is the hazard involved in the use of large quantities of ammonia. Generally these catalysts are prepared in open top tanks, with mixing being achieved by agitation with air. This releases large quantities of ammonia into the atmosphere and constitutes a serious health hazard to the plant employees.

The present invention offers a novel method of avoiding the above difficulties.

In one embodiment the present invention relates to a method of manufacturing a silica-magnesia catalyst which comprises commingling silica hydrogel with magnesium oxide in the presence of an ammonium salt solution having a pH below about 9.

In a specific embodiment the present invention relates to a method of manufacturing a silica-magnesia cracking catalyst which comprises commingling silica hydrogel spheres with magnesium oxide in the presence of an ammonium carbonate solution containing about 0.2 to about 1 mol of ammonium carbonate per mol of magnesium oxide.

In another specific embodiment the present invention relates to the conversion of hydrocarbons and more particularly to the cracking of hydrocarbon oils in the presence of catalysts prepared in the manner herein set forth.

In accordance with the present invention magnesium oxide is commingled with silica hydrogel under specific conditions to form active catalytic composites. Magnesium oxide is considerably less expensive than the magnesium salts heretofore used, and also avoids the necessity of utilizing an additional reagent to precipitate the oxide from the salt. However, the preparation of active catalysts through the medium of magnesium oxide requires the use of specific novel features as herein set forth.

The following discussion is offered as a possible explanation for the improved results obtained by the novel features of the present invention, but not with the intention of limiting the invention to this explanation. When silica hydrogel is commingled with magnesium oxide several reactions occur, including (1) the reaction of magnesium oxide and silica to form the desired silica-magnesium oxide complex which, in the interest of simplicity, is herein referred to as magnesium silicate, (2) the reaction of magnesium oxide with water to form undesired magnesium hydroxide, and (3) due to the high alkalinity of magnesium oxide and magnesium hydroxide, they appear to attack the silica hydrogel granules and tend to put the silica into solution. This leads to the formation of fines and thus destroys the desired particles size and shape of the finished catalyst.

As can be seen from the above explanation, the desired reaction for the formation of active catalysts is that of magnesium oxide with silica to form a complex referred to herein as magnesium silicate, and the undesired reactions include that of magnesium oxide with water to form magnesium hydroxide, as well as the undesired formation of fines as hereinbefore set forth. It has been found that magnesium oxide will react with water to give pH values above 10 and, in accordance with the present invention, an ammonium salt solution having a pH below about 9 is commingled with the magnesium oxide before it is composited with the silica hydrogel. This serves to reduce the pH of the reaction mixture and thereby inhibits the reaction of magnesium oxide with water. In addition, the use of the ammonium salt solution appears to considerably decrease the formation of fines by the magnesium oxide or magnesium hydroxide attacking the silica particles as hereinbefore set forth.

The improved benefits of the present invention are particularly applicable to the preparation of silica-magnesia catalytic composites in the form of particles of definite and preferably uniform size and shape. Thus the invention is especially useful as applied to the manufacture of spherically shaped catalyst composites. Larger size spheres are within the range of from about 1/64" to about 1/4" in diameter, whereas smaller size spheres, which are generally referred to as microspheres, are within the range of from about 10 to about 150 microns in diameter. The use of spherically shaped catalysts is of extreme advantage in hydrocarbon conversion processes. As applied to moving catalyst type processes, including the fluidized process, the moving catalyst bed process, the suspensoid type process, etc. the spheres do not contain sharp edges which tend to break off and thereby cause fines which are lost in the exhaust gases, the spheres do not cause equipment erosion to the large extent caused by particles containing sharp edges, etc. As applied to stationary bed processes, the spheres effect better contact between the reactants and catalyst by avoiding channeling, etc.

Any suitable ammonium salt solution having a pH below about 9 may be employed within the scope of the present invention. Particularly preferred ammonium salt solutions include those of ammonium carbonate, ammonium bicarbonate and ammonium acetate. Other satisfactory but not necessarily equivalent ammonium salt solutions include those of ammonium carbamate, ammonium nitrate, ammonium nitrite, ammonium sulfate, ammonium chloride, ammonium bromide, ammonium iodide, ammonium fluoride, ammonium formate, ammonium propionate, ammonium butyrate, ammonium valerate, ammonium lactate, ammonium malonate, ammonium oxalate, ammonium palmitate, ammonium benzoate, etc., as well as alkyl or aryl substituted ammonium compounds. It is understood that the above ammonium salts are merely representative and that other suitable ammonium salt solutions having a pH below about 9 may be employed within the broad scope of the present invention.

As another essential feature of the present invention, it has been found that the molar proportion of ammonium salt must be within certain limits. These limits range from about 0.05 to about 1 mol per mol of magnesium oxide and preferably from about 0.1 to about 0.8 mol. As will be shown in the examples hereinafter set forth, molar proportions above 1 mol of ammonium salt per mol of magnesium oxide do not result in the improved catalytic composites. Usually this ammonium salt will be employed in the form of aqueous solutions, but it is understood that other suitable solvents may be used when desired.

The silica hydrogel may be formed in any convenient manner and generally is formed by the reaction of an acid with an alkali metal silicate solution at a pH controlled to form silica hydrogel. Silica hydrogel spheres are readily prepared by distributing a mixture of acid and water glass, at a pH within the range of from about 6 to about 8, from a rotating disk or through a nozzle into a layer of oil or other suitable medium of sufficient depth so that the silica hydrogel forms into firm spheres during its passage therethrough. Usually a bed of water is disposed beneath the oil bath and the water serves as a medium for transporting the silica hydrogel spheres from the formation zone into a washing zone. It is understood that silica hydrogel spheres may be formed in any other suitable manner within the scope of the present invention.

The silica hydrogel spheres are preferably washed to remove alkali metal ions introduced through the use of water glass or other alkali silicate reagents. The alkali metal ions may be removed in any suitable manner, a particularly suitable method comprising washing with dilute acid solutions, such as those of hydrochloric acid, sulfuric acid, etc. When desired, the silica spheres may be washed with water before and/or after treatment to remove alkali metal ions.

In accordance with the present invention, an ammonium salt solution having a pH below about 9 is added before the magnesium oxide is composited with the silica. One convenient method is to add the magnesium oxide to the ammonium salt solution and then add the mixture to the silica hydrogel spheres. Another satisfactory method is to add the ammonium salt solution to the silica hydrogel spheres before adding the magnesia thereto, and in still another satisfactory method the magnesia slurry and ammonium salt solution may be added simultaneously to the silica spheres. It is essential that the ammonium salt solution be present before the silica and magnesium oxide are commingled, so that the desired reactions as hereinbefore set forth are effected.

In addition to controlling the reactions occurring between the magnesium oxide, silica and water, the ammonium salt may serve to remove alkali metal ions and thereby to eliminate the necessity for the special treatment as hereinbefore set forth. The alkali metal ions will be replaced by ammonium ions and the latter may be removed in part by water washing or completely removed during heating of the catalyst in the subsequent drying and calcining treatments.

After the silica and magnesia have reacted to form the desired catalytic composite, the composite is preferably washed and dried. In most cases water washing is sufficient, although in some cases it may be desirable to wash the catalyst with an ammonium salt solution. After washing, the catalyst is preferably dried at a temperature of from about 200 to about 500° F. and, when desired, the catalyst may be calcined at a temperature of from about 900° to about 1100° F. for about 1 to 10 hours or more.

In addition to the other advantages hereinbefore set forth, the reduction in fines is extremely important, not only because it means that the spherical shape of the catalyst is not destroyed, but also because it permits ready washing and filtering of the catalyst. The presence of large amount of fines tend to plug the holes in the filtering screen and thereby prevents ready filtering of the catalyst. In addition, it results in large losses of catalyst being carried away in the wash water.

Another particularly suitable method of preparing the catalyst is to commingle a mixture of magnesium oxide in the ammonium salt solution with a slurry of silica granules intimately mix the same, wash and then subject the catalyst to spray drying to form spheres.

As hereinbefore set forth, the silica-magnesia catalysts are particularly suitable for effecting cracking of higher boiling oils and still more particularly in a moving catalyst type process as exemplified by the fluidized process. The catalysts of the present invention do not contain large amounts of fines and therefore avoid high catalyst losses due to the fines being blown out of the system with the exhaust gases. In the fluidized process the catalyst is carried into the reaction zone by the hydrocarbon oil to be cracked or by other suitable media and, after it has served to effect the cracking reaction, the catalyst is transmitted by air or other oxygen-containing gases into a regeneration zone, wherein hydrocarbonaceous deposits are burned from the catalyst and wherein the regenerated catalyst is separated from the combustion gases. A major proportion of the catalyst loss occurs by the catalyst fines being carried out of the system with the vented combustion gases. These losses are excessive when the catalyst contains a large amount of fines. It is thus seen that catalysts prepared by the present invention, which are low in fines and which are strong in physical characteristics, will result in lower catalyst losses.

The following examples are introduced to further illustrate the novelty and utility of the present invention but not with the intention of unduly limiting the same.

EXAMPLE I

Silica hydrogel spheres were prepared by commingling sulfuric acid with water glass and distributing the resulting mixture from a rotating disk into an oil bath, the pH of the mixture being controlled so that the silica sets to firm hydrogel spheres during passage through the oil bath. The spheres were then washed to remove alkali metal ions. The silica spheres were then dried at a temperature of 300° F. for a period of 8 hours and calcined at 1100° F. for 2 hours. These spheres were well shaped and contained a minimum amount of fines.

EXAMPLE II

Silica hydrogel spheres prepared in the manner described in Example I but not dried or calcined were commingled with a slurry of magnesium oxide in water in an amount to produce a finished catalyst containing about 25% magnesia. This catalyst was dried at 300° F. for 8 hours and then calcined at 1100° F. for 2 hours. The catalyst contained a large amount of fines.

EXAMPLE III

A catalyst was prepared in accordance with the teachings of the present invention. The technique of preparation was the same as described in Examples I and II except that ammonium carbonate solution in an amount of 0.5 mol per mol of magnesium oxide was commingled with the magnesium oxide slurry before admixing the same with the silica spheres. The catalyst retained its spherical shape and contained very little fines.

In addition to the advantage of well formed spheres with a minimum of fines, the present invention serves to improve filtration-washing of catalysts. It has been found that catalysts prepared in accordance with the present invention are readily washed and filtered, but that catalysts containing large amounts of fines are difficult to filter because of the fines plugging the filter.

EXAMPLE IV

A series of catalysts was prepared from another batch of silica hydrogel spheres prepared in the manner described in Example I. The silica spheres were commingled with magnesium oxide slurries in an amount to yield a final catalyst containing about 25% magnesium oxide. One batch of catalyst was prepared without an ammonium salt solution, while other batches of catalysts were prepared with aqueous solutions containing different amounts of ammonium carbonate.

These catalysts were tested for cracking activity by the conversion of a 31° A. P. I. gravity Mid-Continent gas oil at a temperature of 932° F., atmospheric pressure, and a weight hourly space velocity (defined as the weight of oil per hour per weight of catalyst) of 4.

The results are indicated in the following table:

*Table I*

| Buffer, Mols per mol MgO | Apparent bulk density | Activity rating | X-ray data |
|---|---|---|---|
| None | 0.48 | 100 | Magnesium silicate+ magnesium oxide. |
| 0.083 mol ammonium carbonate. | 0.43 | 143 | Magnesium silicate. |
| 0.166 mol ammonium carbonate. | 0.50 | 118 | Do. |
| 0.335 mol ammonium carbonate. | 0.65 | 110 | Do. |

The activities of the catalysts are given on a weight basis. For comparative purposes the catalyst prepared in the absence of a buffer was assigned a value of 100 and the activity of the other catalysts is compared thereto on the same basis. It will be noted that the catalysts prepared in the presence of the buffer solution are of higher activity. It further will be noted that the catalyst prepared in the absence of a buffer solution showed the presence of free magnesium oxide, whereas the catalyst prepared in the presence of the buffer solution did not show magnesium oxide by X-ray examination. This further illustrates the advantages of catalysts prepared in the presence of a buffer solution in insuring complete reaction between the magnesia and silica.

EXAMPLE V

A batch of catalysts were prepared in a manner similar to that described in Example IV except that ammonium acetate was used as the buffer solution. These results are indicated in the following table:

Table II

| Buffer, Mols/mol of MgO | Activity rating |
|---|---|
| None | 100 |
| 0.12 mol ammonium acetate | 127 |
| 0.24 mol ammonium acetate | 145 |
| 0.45 mol ammonium acetate | 145 |

Similarly the catalyst prepared in the absence of a buffer solution was assigned a value of 100, and the other catalysts are compared thereto on the same basis. It will be noted that the catalysts prepared in the presence of the buffer solution were of higher activity.

EXAMPLE VI

Another batch of catalysts was prepared in a manner similar to that described in the previous examples but in this case ammonium bicarbonate was used as the buffer solution and the magnesia content of the finished catalyst was about 20%. The ammonium bicarbonate was used in different amounts as shown in the following table:

Table III

| Buffer, Mols/mol of MgO | Activity rating |
|---|---|
| None | 100 |
| 0.50 mol ammonium bicarbonate | 132 |
| 1 mol ammonium bicarbonate | 109 |
| 2 mols ammonium bicarbonate | 98 |

Similarly the catalyst prepared in the absence of a buffer solution was assigned an activity rating of 100, and the other catalysts are compared thereto on the same basis. It will be noted that the catalysts containing more than 1 mol of buffer solution per mol of magnesia was of lower activity than the catalyst prepared in the absence of the buffer solution. This confirms the limitation hereinbefore set forth that the amount of buffer solution to be used should not be greater than about 1 mol per mol of magnesia.

EXAMPLE VII

A batch of silica microspheres, prepared in the manner described in Example I, was commingled with a slurry of magnesium oxide containing 0.2 mol of ammonium carbonate per mol of magnesium oxide. The mixture was then agitated with air for 1 hour and then allowed to settle for 10 minutes. The catalyst was then washed with water containing 1 gram of ammonium carbonate per gallon of water. After washing, the spheres were dewatered and then dried at 320° F. for 10 hours. The final catalyst contained 23.2% magnesia on a dry basis.

This catalyst was used for the cracking of Mid-Continent gas oil at a temperature of 901° F., pressure of 2 pounds per square inch gage and weight hourly space velocity of 1.72 in a fluidized process. The following products were obtained in the above operation.

| Weight Basis | Per Cent |
|---|---|
| Gasoline | 49.6 |
| Recycle oil | 28.2 |
| $C_3$ and lighter gases | 7.1 |
| $C_4$ gases | 10.2 |
| Coke | 4.9 |

The gasoline had a A. S. T. M. motor method octane number of 78.2, which upon the addition of 3 cc. of tetraethyl lead was 84.9.

It will be noted that this catalyst produced a high yield of gasoline of high octane number, with a comparative low production of coke and gas. The gases were high in olefins, which may be polymerized to further increase the yield of high octane gasoline.

We claim as our invention:

1. A method of manufacturing a silica-magnesia catalyst which comprises commingling silica hydrogel with a sufficient amount of magnesium oxide to form a final catalyst composite containing from about 20% to about 40% by weight of magnesia, said hydrogel and magnesium oxide being commingled in the presence of an added solution consisting essentially of an ammonium salt and water and having a pH below about 9 and containing from about 0.05 to about 1 mol of ammonium salt per mol of said magnesium oxide.

2. A method of manufacturing a silica-magnesia catalyst which comprises commingling silicia hydrogel with a slurry consisting essentially of magnesium oxide and an ammonium salt solution having a pH below 9, the amount of said magnesium oxide being sufficient to form a final catalyst composite containing from about 20% to about 40% by weight of magnesia and said ammonium salt being present in said solution in an amount of from about 0.05 to about 1 mol per mol of the magnesium oxide.

3. The method of claim 1 further characterized in that said silica hydrogel is in the form of spheres.

4. The method of claim 1 further characterized in that said ammonium salt is ammonium carbonate.

5. The method of claim 1 further characterized in that said ammonium salt is ammonium bicarbonate.

6. The method of claim 1 further characterized in that said ammonium salt is ammonium acetate.

7. The method of claim 2 further characterized in that said ammonium salt is ammonium carbonate.

8. The method of claim 2 further characterized in that said ammonium salt is ammonium bicarbonate.

9. The method of claim 2 further characterized in that said ammonium salt is ammonium acetate.

GLENN M. WEBB.
RENO W. MOEHL.
MAURICE J. MURRAY.

REFERENCES CITED

The following references are of record in the file of this patent:

UNITED STATES PATENTS

| Number | Name | Date |
|---|---|---|
| 2,278,590 | Ruthruff | Apr. 7, 1942 |
| 2,355,388 | Michael et al. | Aug. 8, 1944 |
| 2,387,596 | Marisic | Oct. 23, 1945 |
| 2,390,556 | Ruthruff | Dec. 11, 1945 |
| 2,400,446 | Veltman | May 14, 1946 |
| 2,462,236 | Thomas | Feb. 22, 1949 |

FOREIGN PATENTS

| Number | Country | Date |
|---|---|---|
| 556,711 | Great Britain | Oct. 19, 1943 |